8890X
J. Snyder,
Grate.
Patented June 12. 1835.
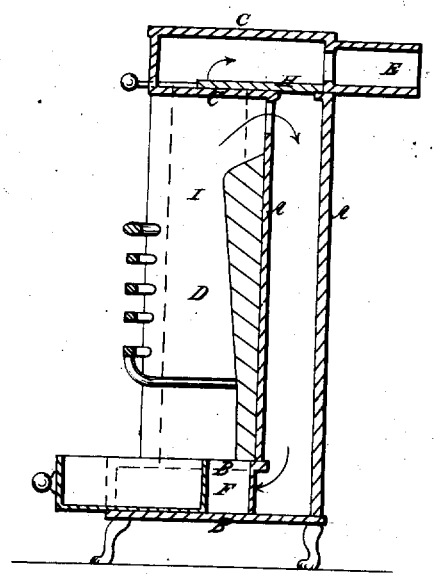
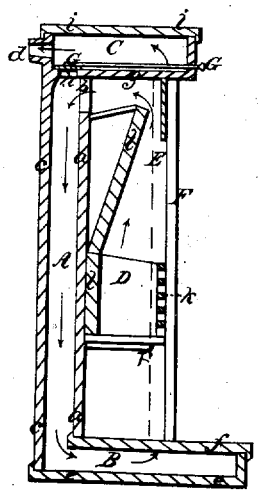
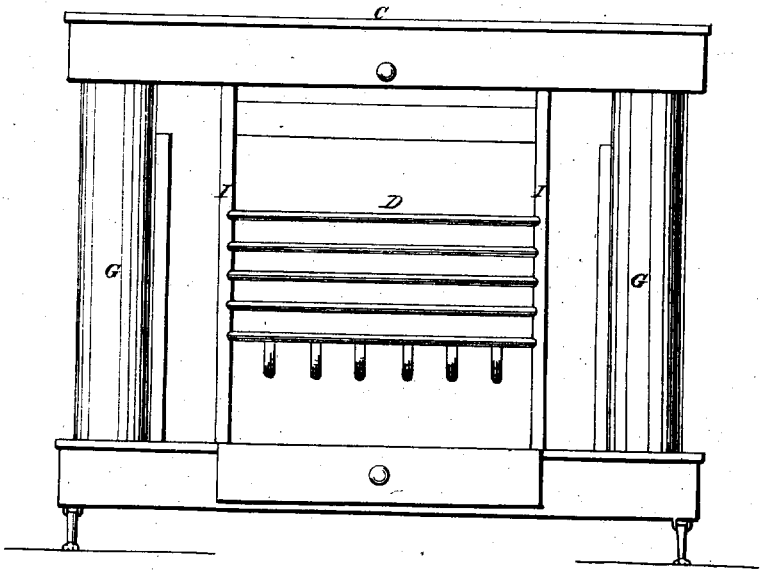

8840X June 12. 1835 111

Joseph Snyder of Philadelphia Pennsylvania

Letters Patent.

The Schedule referred to in these Letters Patent making part of the same containing a description in the words of the said Joseph Snyder himself of his improvement in fire places for grates to burn anthracite and other coal.

To all to whom these presents shall come.
Be it known that I Joseph Snyder of the county of Philadelphia in the State of Pennsylvania, have invented a new and useful improvement in Fire places for grates to burn anthracite and other coal, and that the following is a full and exact description of the construction and operation of the same as invented and improved by me. The fire place is constructed of cast iron or any other suitable material and of any dimensions to suit the apartment for which it is intended, First the back which is double is formed by two vertical parallel plates standing a few inches asunder, the space between them forming the back flue of the fire place, the anterior one of these plates, rises from the top plate of the hearth and extends to the inferior top plate of the fire place which it supports, the middle of the upper edge being notched out the whole width of the fire chamber, so as to make a communication between the fire chamber and the flues hereafter mentioned. The rear plate of the back stands on the lower plate of the hearth, and rises to the upper top plate which it supports, it is cast with wings or flanges at its upright edges, which join in the usual manner, with the ends of the anterior plate of the back, and form the sides or ends of the back flue, also an oblong opening near the top having a flange is left for the smoke funnel, the hearth which is likewise double consists of two horizontal parallel plates with the same space between them

8840X them as between the back plates, forming the hearth flue, which is a continuation of the back flue, the lower hearth plate is cast with a vertical rim or flange on the front and side edges which joins with and supports the top plate of the hearth, The top plate which only extends to the anterior plate of the back, which latter rests upon it, is cast with a sink in the middle or immediately under the fire chamber to receive the ashes or drawer &c in the common way, and near each end of said plate about in a line with the middle of the ash pit two circular or square holes are left in the casting, forming communications between the hearth flue and two hollow columns or tubes which may be either square or round, and rise on each side of the fire chamber from the hearth to the bottom plate of the top of the fire place, which they support, these columns being intended to continue the draught or flue from the hearth to the top of the fire place, The top of the fire place which like the back and hearth is double, consists of two horizontal parallel plates with a space between them forming the top flue, the lower plate being cast with flanges on three of its sides that join the top plate (the flange of the rear edge being supplied by the rear plate) with two square or circular openings to communicate with the upright tubes or columns, and also with an oblong hole situated immediately over the back flue, which is closed and opened by a suitable damper that slides by means of a rod and handle, in the front of the top, being intended when open to make a direct communication between the fire chamber and smoke funnel that leads into the chimney, whilst the fire is kindling, the top plate is cast in the usual manner flat and without openings, The top of the fireplace extends the whole width of the back, and beginning at the back plate thereof, projects forward sufficient far to cover the fire chamber and upright tubes or columns, The fire chamber is formed by two upright jambs between the columns, which reach from the hearth to the top, which latter they assist in supporting;

8840X between these jambs an open grate of any construction is placed in the usual manner, and is furnished with a soapstone back that inclines forward at top in the ordinary way. The stove which is confined together in the usual manner by rods &c. may either be placed on mason work or feet the latter however I prefer and in order to get the whole benefit of the heat. I also prefer that it should stand out from the wall or chimney place, so that the back plate may not touch it by a space of one or two inches.

Operation the damper being removed (if necessary) the fire is kindled in the usual manner by the aid of a blower applied to the front of the fire chamber, after the fire is kindled, remove the blower and close the damper in the top. the draught and smoke will then rise over the top of the anterior plate of the back and decending through the back flue to the hearth flue will rise again through the columns into the top flue, and pass thence through the smoke funnel into the chimney heating in its passage all the plates of the fire place by the heat which in those of ordinary construction have ascended the chimney; this together with the diffusion of the heat to the hearth and those parts of the fire place, situated below the fire, thereby adding greatly to its comfort, constitute the great advantage of my fire place. I have omitted giving particular dimensions in the description as these may be varied to suit circumstances, but the following are the principle dimensions of a fire place which I now have in actual use, and which I have found to answer well, whole width of the stove 3 feet 2 Inches in space between back plates, hearth plates & top plates or width of the flues 3 inches - depth of the fire chamber 8 inches; width of do. 19 Inches, width of hearth including back flue, apron &c. 13 inches width of top 11 Inches, diameter of columns (cylindrical) 4½ inches, whole hight including hearth and top 2 ft. 8 inches Now what I claim as new and as my invention is the principle of diffusing the heat of an open fire place or grate to the 114. 8890X hearth and parts situated below the fire by a descending and ascending flue or flues, and double hearth as hereinbefore set forth and described.

In testimony that the foregoing is a true specification of my said improvement, I have hereunto set my hand this 14th day of May 1835

Witnesses
R. G. Campbell
Saml. Stevenson

Joseph Snyder

[1236 wds.

(Drawing)